United States Patent
Mirza et al.

(10) Patent No.: US 9,531,887 B2
(45) Date of Patent: *Dec. 27, 2016

(54) CONFORMITY ANALYSIS SYSTEM FOR ANALYZING CONFORMITY TO RESTRICTIONS ON THE USE OF A WIRELESS COMMUNICATION DEVICE

(71) Applicant: Sprint Communications Company L.P., Overland Park, KS (US)

(72) Inventors: Nasir Mahmood Mirza, Overland Park, KS (US); Syed Hassan Raza, Leawood, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/815,039

(22) Filed: Jul. 31, 2015

(65) Prior Publication Data

US 2015/0341506 A1   Nov. 26, 2015

Related U.S. Application Data

(63) Continuation of application No. 12/978,689, filed on Dec. 27, 2010, now Pat. No. 9,137,620.

(51) Int. Cl.
| | |
|---|---|
| *H04M 3/42* | (2006.01) |
| *H04M 15/00* | (2006.01) |
| *H04W 4/00* | (2009.01) |
| *H04W 4/24* | (2009.01) |
| *G06F 21/57* | (2013.01) |
| *H04L 29/06* | (2006.01) |

(52) U.S. Cl.
CPC ............ *H04M 15/885* (2013.01); *G06F 21/57* (2013.01); *H04M 15/61* (2013.01); *H04M 15/846* (2013.01); *H04W 4/00* (2013.01); *H04W 4/24* (2013.01); *H04L 63/102* (2013.01)

(58) Field of Classification Search
CPC .. H04L 63/083; H04L 12/2803; H04L 12/189; H04L 63/101; H04L 63/0823; H04L 67/22; H04L 63/102; H04L 63/08; H04L 63/01; H04W 12/08; H04W 12/06; H04W 84/18; H04W 88/02; H04W 88/06; G06Q 20/3674; G05B 19/0426; G05B 2219/24159; G06F 21/53; G06F 2221/2149; G06F 21/31; G06F 21/121; G06F 21/445; G06F 11/1438; G06F 12/145; G06F 2221/0735; G06F 2221/2113; G06F 2221/2131; G06F 9/4443
USPC . 455/405, 410, 414.1, 418, 425, 411; 726/4, 726/27, 29, 1, 17, 2, 26, 28, 6; 709/229, 709/225, 208, 220, 228
See application file for complete search history.

(56) References Cited

U.S. PATENT DOCUMENTS

| | | | |
|---|---|---|---|
| 7,200,154 B1 | 4/2007 | Wu et al. | |
| 9,137,620 B1 * | 9/2015 | Mirza | H04W 4/00 |

(Continued)

*Primary Examiner* — Fred Casca

(57) ABSTRACT

A wireless communication device displays an icon for an application and stores a data restriction for the application. The wireless communication device receives a user selection of the icon and receives wireless data for the application. The wireless communication device compares an amount of the received wireless data for the application to the data restriction for the application to determine a data conformity level for the application. The wireless communication device translates the data conformity level for the application to a color. The wireless communication device displays the icon for the application surrounded by the color to indicate the data conformity level of the application.

20 Claims, 10 Drawing Sheets

(56) References Cited

U.S. PATENT DOCUMENTS

| | | |
|---|---|---|
| 2003/0156119 A1 | 8/2003 | Bonadio |
| 2008/0102812 A1 | 5/2008 | Chari et al. |
| 2008/0102813 A1 | 5/2008 | Chari et al. |
| 2008/0120693 A1 | 5/2008 | Beilinson et al. |
| 2008/0133431 A1 | 6/2008 | Hancock et al. |
| 2009/0193485 A1 | 7/2009 | Rieger et al. |
| 2009/0231997 A1* | 9/2009 | Yang ................ H04M 1/72522 370/229 |
| 2010/0024028 A1* | 1/2010 | Baugher ................ G06F 21/62 726/17 |
| 2010/0189034 A1 | 7/2010 | Nagasawa et al. |
| 2010/0205471 A1 | 8/2010 | Vavilala et al. |
| 2011/0265179 A1 | 10/2011 | Newman et al. |
| 2011/0283311 A1 | 11/2011 | Luong |
| 2011/0312283 A1* | 12/2011 | Rodbro ................ H04L 47/20 455/68 |
| 2012/0331166 A2 | 12/2012 | Stirbu et al. |

\* cited by examiner

CONFORMITY ANALYSIS SYSTEM FOR ANALYZING CONFORMITY TO RESTRICTIONS ON THE USE OF A WIRELESS COMMUNICATION DEVICE

RELATED CASES

This patent application is a continuation of U.S. patent application Ser. No. 12/978,689 that was filed on Dec. 27, 2010 and is entitled "CONFORMITY ANALYSIS SYSTEM FOR ANALYZING CONFORMITY TO RESTRICTIONS ON THE USE OF A WIRELESS COMMUNICATION DEVICE." U.S. patent application Ser. No. 12/978,689 is hereby incorporated by reference into this patent application.

TECHNICAL BACKGROUND

The increased popularity and widespread use of mobile applications has created many challenges to the provisioning and delivery of wireless communication services. While mechanisms are in place to control access to the finite resources of most wireless networks, the relative unfamiliarity of most users with the impact of applications on network performance and service costs may lead to degraded service levels and unforeseen billing charges.

For example, it is common for a user to launch an application on a mobile phone, only to have that application run in the background nearly perpetually. The application may not only require network resources to operate—such as wireless bandwidth between the mobile phone and a base station—but it may also over use resources of the phone itself, such as battery life. Multiplied many times over across many phones, network performance in a wide area can degrade, leading to customer complaints and dissatisfaction.

In the past, a wide variety of pricing plans have been used to control access to network resources. But with the wide variety of applications available pre-installed on modern phones and available via applications stores online, it is difficult for a user to understand the potential impact of any particular application on both the performance of the network and the performance of his own phone. This is made even more difficult by the fact that network conditions vary, and thus so will the impact of an application. In addition, the performance of the application itself may degrade based on network conditions at any given time.

Regardless of performance issues, it is also difficult for a user to understand the cost implications of running an application. For instance, in a case where a user subscribes to a pricing plan that discourages data usage during peak periods, the user may not be aware of the relative data-intensity of a given application relative to any others. This can lead to unexpected charges for exceeding data limits, and ultimately to dissatisfied customers.

OVERVIEW

A wireless communication device displays an icon for an application and stores a data restriction for the application. The wireless communication device receives a user selection of the icon and receives wireless data for the application. The wireless communication device compares an amount of the received wireless data for the application to the data restriction for the application to determine a data conformity level for the application. The wireless communication device translates the data conformity level for the application to a color. The wireless communication device displays the icon for the application surrounded by the color to indicate the data conformity level of the application.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
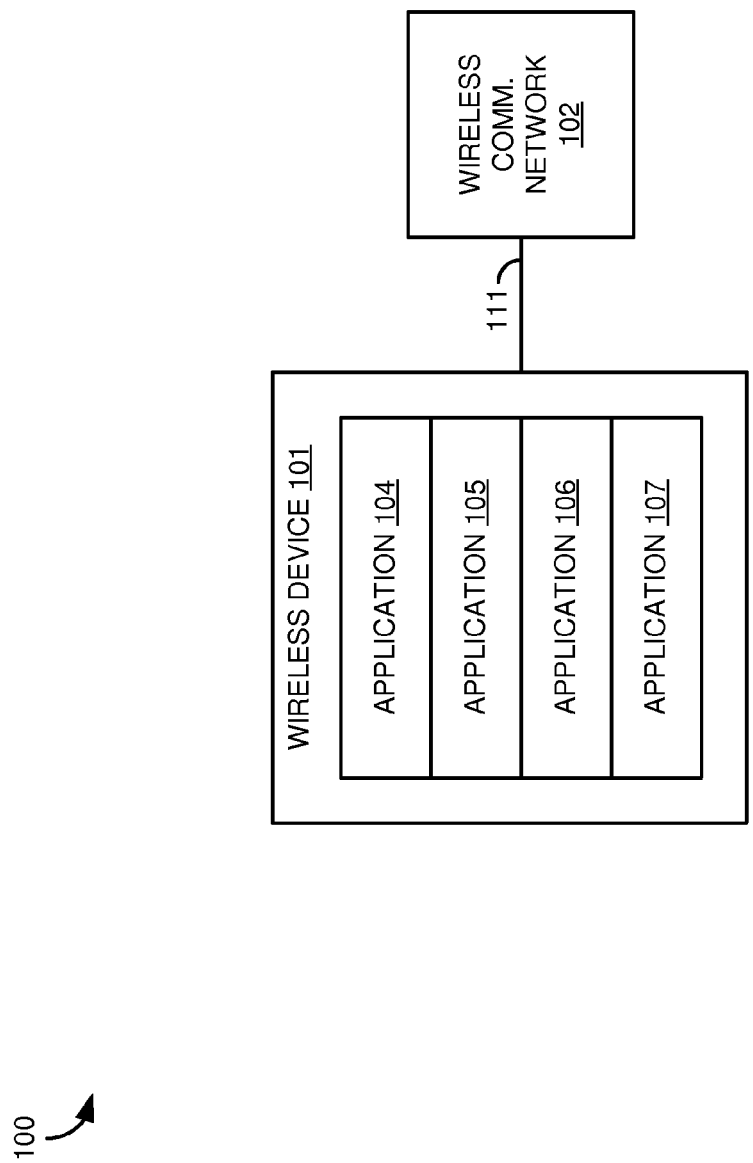
FIG. 1 illustrates a wireless communication system for analyzing conformity to restrictions on the use of a wireless communication device.

FIG. 1 illustrates wireless communication system 100. Wireless communication system 100 includes wireless communication device 101 and wireless communication network 102. Wireless communication device 101 and wireless communication network 102 communicate over wireless link 111.

In operation, wireless device 101 is capable of running applications 104-107. Applications 104-107 may include email clients, text messaging clients, web browsers, social networking apps, or any other type of application capable of running on a wireless device. Some or all of applications 104-107 may use resources of wireless network 102 to access the communication services provided by wireless network 102. For example, a messaging application uses text messaging resources of wireless network 102, a phone application uses voice call resources of wireless network 102, and a web browser uses data resources of wireless network 102. As additional wireless devices use the resources of wireless network 102, the network performance of wireless network 102 may degrade, which can lead to an unsatisfactory user experience on wireless device 101.

Furthermore, in an effort to control wireless network resource usage, a variety of pricing plans may be employed for connecting wireless devices, such as wireless device 101. For example, a user of wireless device 101 may have subscribed to a service plan for wireless device 101 that charges more for resources used during peak hours or limits the amount of resources that can be used by wireless device 101 during peak hours. These pricing plan constraints, along with the network congestion issues discussed above and other possible constraints on the use of a wireless device, may effectively restrict the use of the various resources of wireless network 102 by wireless device 101.

Traditionally, applications 104-107 do not account for restrictions on the use of wireless network 102 resources by wireless device 101. Likewise, a user may not be aware of the resource usage by a particular application and how that resource usage will be effected by any restrictions on the use of wireless device 101 in regards to the resources of wireless network 102. Therefore, the operation of the applications may violate the restrictions causing an unsatisfactory user experience, such as poor performance or cost overages.

Figure 2:
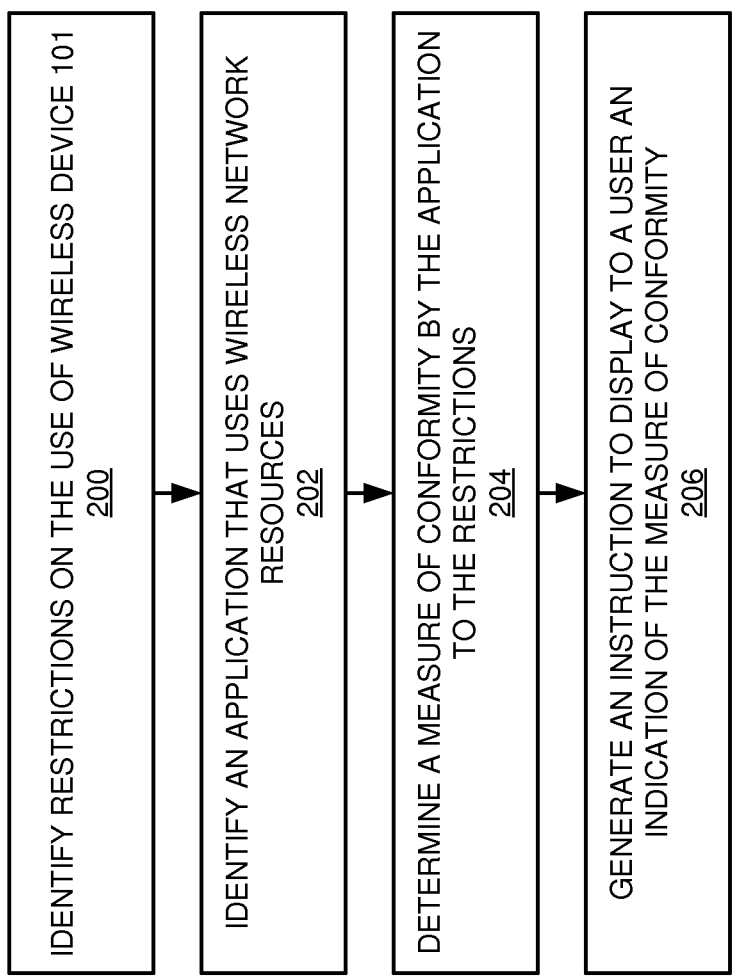
FIG. 2 illustrates the operation of a wireless communication system to analyze conformity to restrictions on the use of a wireless communication device.

FIG. 2 illustrates the operation of wireless communication system 100. Wireless device 101 begins the operation by identifying restrictions on the use of wireless device 101 having applications 104-107 available to wireless device 101 (step 200). Applications 104-107 may be available to wireless device 101 by currently executing on wireless device 101 or by being installed or otherwise in storage on wireless device 101 so that wireless device 101 may execute applications 104-107 upon an instruction to do so. Alternatively, applications 104-107 may be available to wireless device 101 by being present in an application store for download and execution on wireless device 101, by executing remotely, being able to execute remotely upon an instruction to do so, or any other way that an application can be accessible to wireless device 101.

The restrictions on the use of wireless device 101 may include restrictions on a service plan cost to a user of wireless network 101 for the use of network resources, a cost to the operator of wireless network 102 for the use of network resources, a service plan allotment of resources to wireless device 101, an amount of resources currently available on wireless network 102 for use by wireless device 101, or anything else that may restrict the use of wireless network 102 resources by wireless device 101. For example, a service plan subscribed to by a user of wireless device 101 may charge different amounts of money for use of wireless network 102 resources during different times or when wireless device 101 is roaming. In another example, the service plan may allow for a limited amount of resources to be used by wireless device 101 and may either cut of the resource usage or charge more to the user if that limited amount of resource usage is exceeded. Similarly, a restriction may exist based on the currently available resource capacity of wireless network 102.

The restrictions may be identified by querying one or more systems on wireless network 102, may be stored locally in a memory of wireless device 101, may be indicated by a user, may be ascertained via test actions by wireless device 101, or any other way that a wireless device may obtain restriction information. For example, wireless device 101 may query a billing system for service plan cost or resource amount restrictions on wireless device 101. Likewise, wireless device 101 may query a system on wireless network 102 to obtain information about current network resource availability on wireless network 102. For example, wireless network 102 may have a limited amount of bandwidth available for use by wireless device 101 due to high network load. Alternatively, wireless device 101 may have service plan information stored locally in a memory and may transfer test messages to test network resource availability.

Additionally, wireless device 101 identifies applications of applications 104-107 available to wireless device 101 that use resources of wireless network 102 (step 202). In other words, applications 104-107 may not all use resources of wireless network 102 when executing. For example, most calculator applications do not require network resources in order to function. Thus, for the purposes of the operation described in FIG. 2, application 104 does not use network resources. Consequently, wireless device 101 identifies that applications 105-107 are applications that use resources of wireless network 102. Wireless device 101 may identify applications that use resources of wireless network 102 by monitoring resource use of an executing application, by receiving resource usage information from each application, by recognizing usage information from past executions of an application, by querying a remote system for resource usage information, or by any other way that a wireless device may determine network usage information.

Wireless device 101 can then determine a measure of conformity by the applications to the restrictions on the use of the wireless communication device (step 204). Therefore, since wireless device 101 identified applications 105-107 as using resources of wireless network 102, wireless device 101 compares the resources required by each of applications 105-107 to the restrictions on the use of wireless device 101. The measure of conformity is created based on this comparison. Thus, the measure will indicate that an application conforms better to the restrictions if the resource usage of the application is further away from the limits of the restriction.

For example, if application 105 requires 100 kbps of bandwidth and a restriction limits wireless device to using 900 kbps of bandwidth, then application 105 will have a better conformity measure than application 106 if application 106 requires 800 kbps of bandwidth. Similarly, application 107 would be given a poor measure of conformity if application 107 requires more bandwidth than the 900 kbps allowed by the restriction.

In another example, if application 105 is a text messaging application and a restriction allows only 500 text messages per month before charging extra to the user, then the measure of conformity for application 105 may get worse as application 105 approaches or exceeds the 500 text message limit.

The measure of conformity may be determined based on whether the network resource usage of an individual application by itself conforms to the restrictions on the use of wireless device 101. The measure of conformity may also be determined in relation to other applications available to wireless device 101. For example, the measure of conformity may be determined in relation to applications that are currently executing on wireless device 101. Thus, while the resource usage of an application by itself may conform to the restrictions, if the resource usage of the application is combined with the resource usage of applications already executing on wireless device 101, then wireless device 101 as a whole would not be conforming to the restrictions on wireless device 101. Likewise, a user may select multiple available applications and wireless device 101 determines the measure of conformity for each application based on how well the group of applications would conform to the restrictions on wireless device 101.

After determining the measure of conformity for the applications, wireless device 101 generates an instruction to display to a user an indication of the measure of conformity by the applications to the restrictions on the use of wireless device 101 (step 206). The measure of conformity may be instructed to be displayed in a variety of ways. For example, applications 105-107 may be listed in order of conformity, an indicator may be displayed next to the displayed icon of applications 105-107, the icon for applications 105-107 may be modified to represent the measure of conformity, applications 105-107 may be sorted into groups based on the measures of conformity, or any other way to inform a user of a measure of conformity for an application. In some examples, application 104 may also be included as an application with a high measure of conformity since application 104 does not use any network resources.

Advantageously, when wireless device 101 displays the measure of conformity to a user, the user will be able to make a decision about whether to use the application. For example, if the user sees a display indication that a particular app does not conform to the restrictions on wireless device 101, then the user may choose not to use that application. Alternatively, in some embodiments, the execution of those applications with poor measures of conformity may be prevented by wireless device 101.

The process set forth above may repeat periodically in order to keep the displayed measures of conformity updated based on current restrictions on the use of wireless device 101. Alternatively, the process may repeat whenever a user wakes wireless device 101 from a stand by mode in order to keep the displayed measures of conformity updated based on current restrictions on the use of wireless device 101.

In some embodiments, wireless device 101 may determine a measure of conformity for each restriction rather than a single overall measure of conformity. Furthermore, the instruction to display the measure of conformity may include these restriction specific measures of conformity. Therefore, if a user is displayed more specific measures of conformity, then the user may be able to make a more informed decision about whether to use a particular application. For example, if there is a poor measure of conformity for an application to a restriction based on network data congestion, then the user may still decide to use the application despite the risk of poor data performance. Alternatively, if there is a poor measure of conformity for an application to a restriction based on high data plan cost for the user, then the user may choose to use the application at a different time when the data plan cost for the user is lower. The more specific measures of conformity may be displayed in a sub menu of the overall measure of conformity or may be displayed along with the overall measure of conformity depending on how the measure of conformity is displayed to the user.

Similarly, for restrictions that vary based on time, such as with a service plan that provides different costs for peak and off-peak usage, wireless device 101 may determine a measure of conformity for each time period of the restriction. The instruction to display the measure of conformity may also include these time dependent measures. Therefore, if a user is displayed the time dependent measures of conformity, then the user may be able to make a more informed decision about when to use a particular application.

It should be understood that the process described for FIG. 1 could be performed in a system or multiple systems in wireless network 102. For example, a conformity system in wireless network 102 may identify the applications available to wireless device 101 along with any restrictions on the use of wireless device 101. The conformity system then determines a measure of conformity for the applications that use network resources and transfers a display instruction to wireless device 101 indicating that wireless device 101 should display the measures of conformity.

Figure 3:
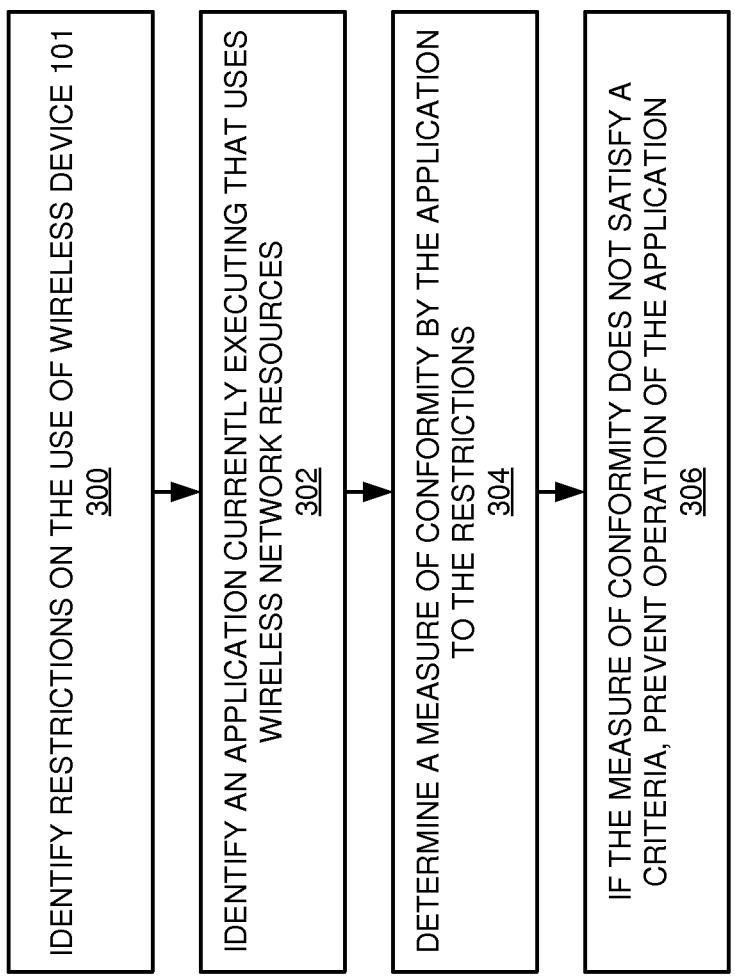
FIG. 3 illustrates the operation of a wireless communication system to analyze conformity to restrictions on the use of a wireless communication device.

FIG. 3 also illustrates the operation of wireless communication system 100. Wireless device 101 begins the operation by identifying restrictions on the use of wireless device 101 (step 300). The restrictions are identified the same way as described above for FIG. 1. Additionally, wireless device 101 identifies applications of applications 104-107 that are currently executing on wireless device 101 and using network resources (step 302). Therefore, the identified applications are currently running on wireless device 101 and not simply available for execution as described in FIG. 1. The applications may be running in the foreground or in the background of wireless device 101 and, thereby, a user does not need to currently be interacting with the application for the application to be identified. In this example, wireless device 101 determines that applications 105 and 106 are running on wireless device 101.

Wireless device 101 then determines a measure of conformity by applications 105 and 106 to the restrictions on the use of wireless device 101 (step 304). Since, applications 105 and 106 are executing on wireless device 101, wireless device 101 determines whether the resources that each of applications 105 and 106 are presently using conforms to the restrictions on wireless device 101.

If the measure of conformity does not satisfy a criteria, wireless device 101 prevents the operation of application 105 and/or 106 (step 306). The criteria may be a threshold value for the measure of conformity. If the measure of conformity crosses the threshold, then the operation of application 105 and/or 106 is prevented. Preventing the operation of application 105 and/or 106 may include terminating the execution of application 105 and/or 106 or preventing application 105 and/or 106 from using the resources of wireless network 102.

In some embodiments, wireless device 101 may display a notification to a user of wireless device 101 that application 105 and/or 106 has been prevented from operating. Similarly, in some embodiments, wireless device 101 may query the user for an indication about whether application 105 and/or 106 should be prevented from operating. In those embodiments, the user may look at a display of restriction specific measures of conformity in order to make an informed decision about whether the user desires application 105 and/or 106 to be prevented from operating.

Referring back to FIG. 1, wireless communication device 101 comprises Radio Frequency (RF) communication circuitry and an antenna. The RF communication circuitry typically includes an amplifier, filter, modulator, and signal processing circuitry. Wireless communication device 101 may also include a user interface, memory device, software, processing circuitry, or some other communication components. Wireless communication device 101 may be a telephone, computer, e-book, mobile Internet appliance, wireless network interface card, media player, game console, or some other wireless communication apparatus—including combinations thereof.

Wireless communication network 102 comprises network elements that provide wireless devices with wireless communication access to packet communication services. Wireless network 102 may comprise switches, wireless access nodes, Internet routers, network gateways, application servers, computer systems, communication links, or some other type of communication equipment—including combinations thereof.

Wireless link 111 uses the air or space as the transport media. Wireless link 111 may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format.

Figure 4:
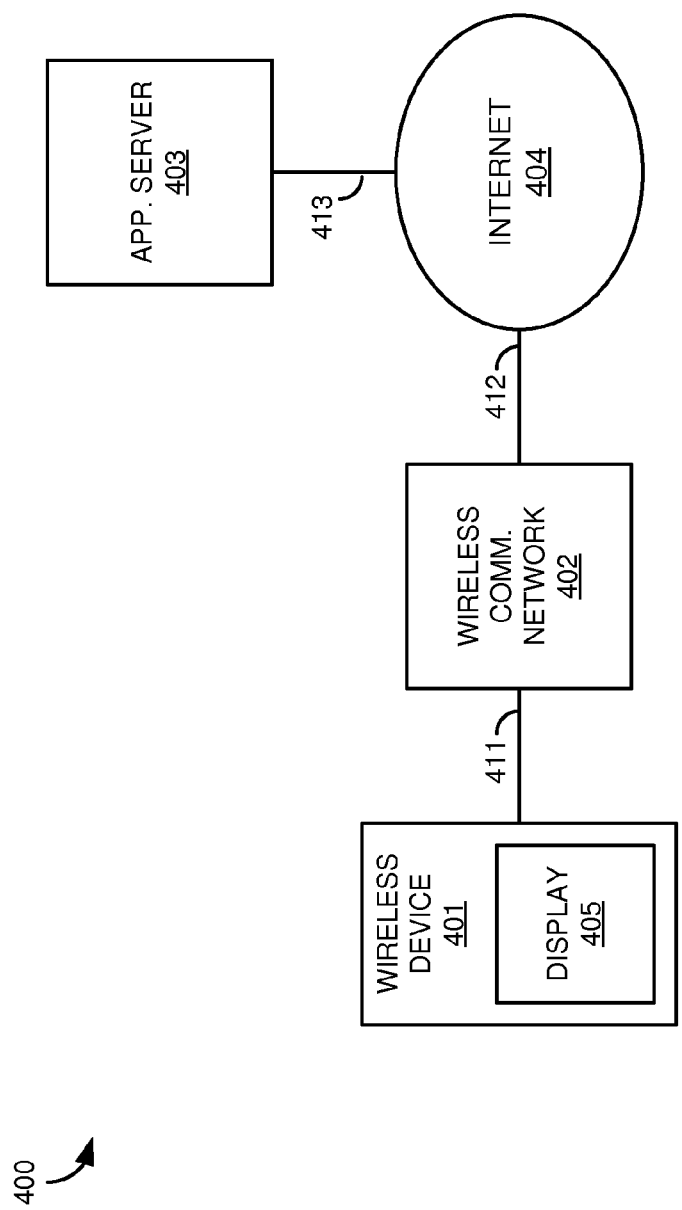
FIG. 4 illustrates a wireless communication system for analyzing conformity to restrictions on the use of a wireless communication device.

FIG. 4 illustrates wireless communication system 400. Wireless communication system 400 includes wireless communication device 401, wireless communication network 402, application server 403, and Internet 405. Wireless communication device 401 includes display 406. Wireless communication device 401 and wireless communication network 402 communicate over wireless link 411. Wireless communication network 402 and Internet 405 communicate over communication link 412. Internet 405 and application server 403 communicate over communication link 413.

Communication links 412 and 413 use metal, glass, air, space, or some other material as the transport media. Communication links 412 and 413 could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. Communication links 412 and 413 could be direct links or may include intermediate networks, systems, or devices.

Figure 5:
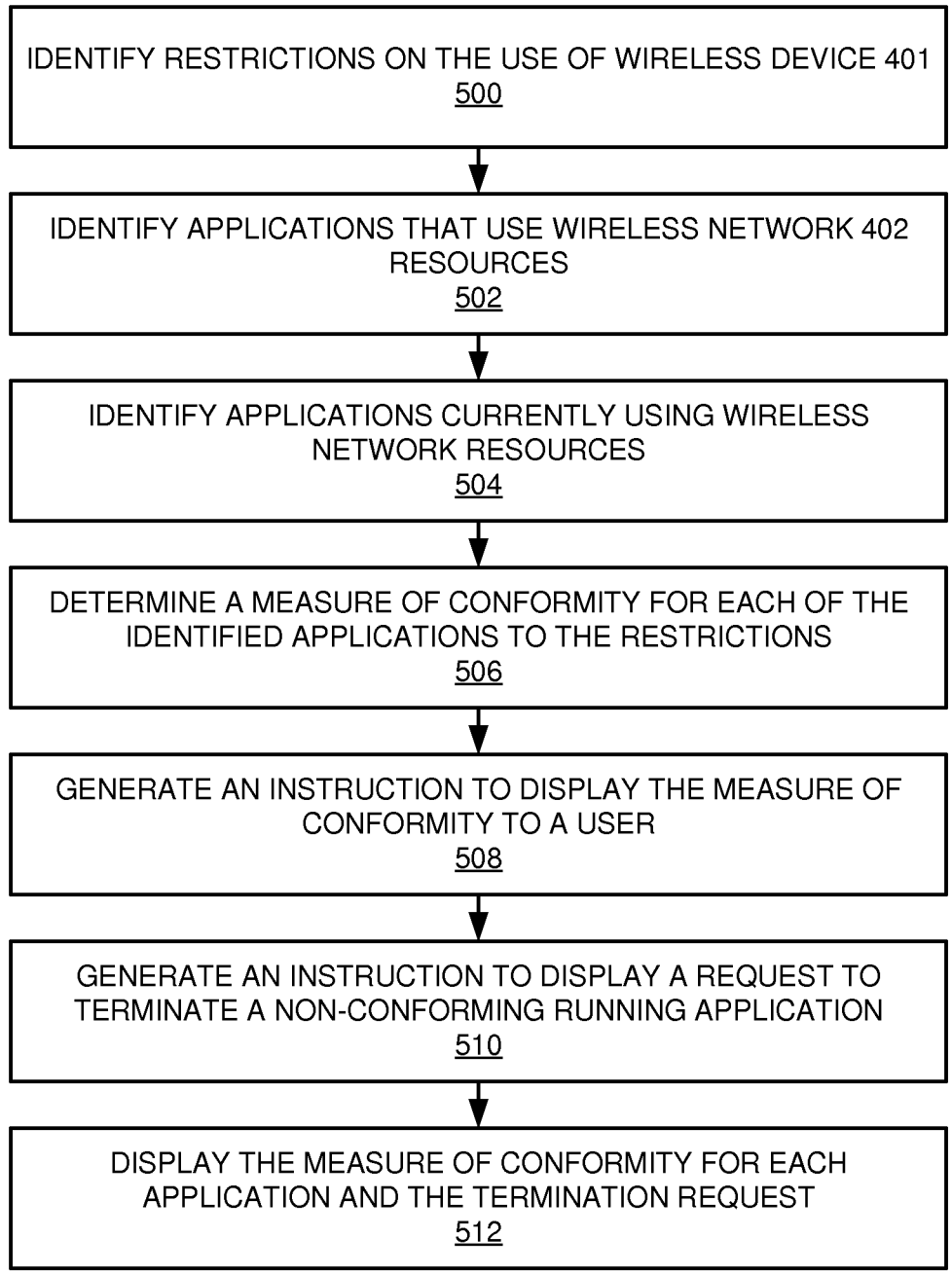
FIG. 5 illustrates the operation of a wireless communication system to analyze conformity to restrictions on the use of a wireless communication device.

FIG. 5 illustrates the operation of wireless communication system 400. Wireless device 401 begins by identifying restrictions on the use of wireless device 401 (step 500). The restrictions may include service plan restrictions for wireless device 401, restrictions on the use of wireless network 402 resources independent of an individual wireless device, limitations on the service capacity of wireless network 402, or any other type of restriction on the use of wireless device 401.

Additionally, wireless device 401 identifies applications available to wireless device 401 that use resources of wireless network 402 when executing (step 502). The available applications need not be executing on wireless device 402 and include installed applications, remote applications, such as cloud based applications, and applications that can be installed on wireless device 402, such as from an application store. Wireless device 402 further identifies a subset of the available applications consisting of those available applications that are presently executing on wireless device, or are otherwise executing as a remote application, and are using resources of wireless network 402 (step 504).

Wireless device 401 then determines a measure of conformity for each of the identified applications (step 506). For the subset of available applications that are currently executing on wireless device 101, the actual wireless network 402 resource usage of the application is used to determine whether the application conforms to the restrictions on the use of wireless device 401. For example, if an application is currently executing on wireless device 401 and exchanging data packets with application server 403 over wireless network 402 and Internet 405, then that application is using the data service resources of wireless network 402. Consequently, wireless device 402 compares the actual data usage by the application to any data usage restrictions on wireless device 401.

For the other available applications, wireless device 401 uses a projected wireless network 402 resource usage to determine whether the application will conform to the restrictions on the use of wireless device 401 when executed. The projected usage may be determined from past application resource usage, information from the application indicating resource usage statistics, or any other way by which wireless device 401 may obtain or derive a projected resource usage.

After determining the measures of conformity for the available applications, wireless device 401 generates an instruction to display the measure of conformity for each application to a user (step 508). Additionally, wireless device 401 generates an instruction to display a request to terminate any non-conforming application that is currently executing on wireless device 401 (step 510).

Figure 7:
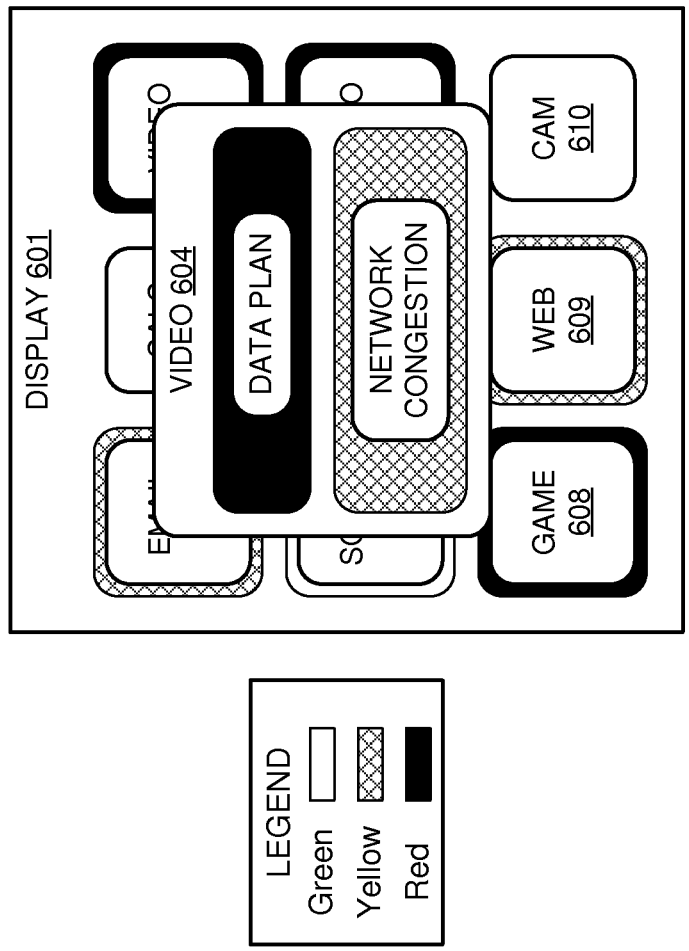
FIG. 7 illustrates a display for presenting conformity to restrictions on the use of a wireless communication device.
Figure 8:
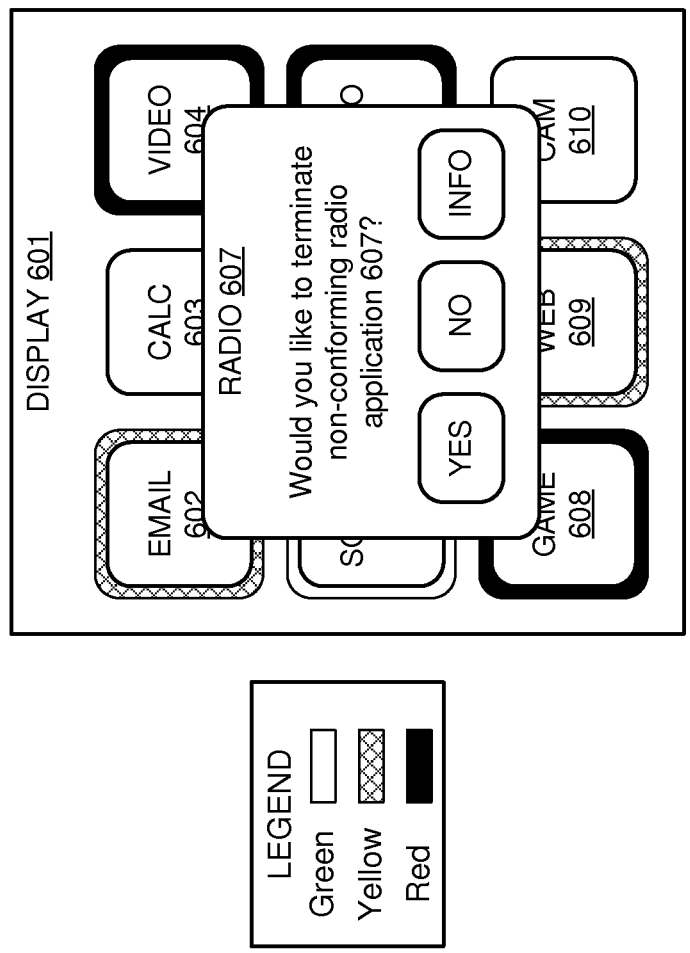
FIG. 8 illustrates a display for presenting conformity to restrictions on the use of a wireless communication device.

In response to the instructions, display 406 generates a visual that informs the user about the measure of conformity for each application and prompts the user to terminate any non-conforming applications (step 512). The visual may take many forms but FIGS. 6-8 depict specific examples.

Figure 6:
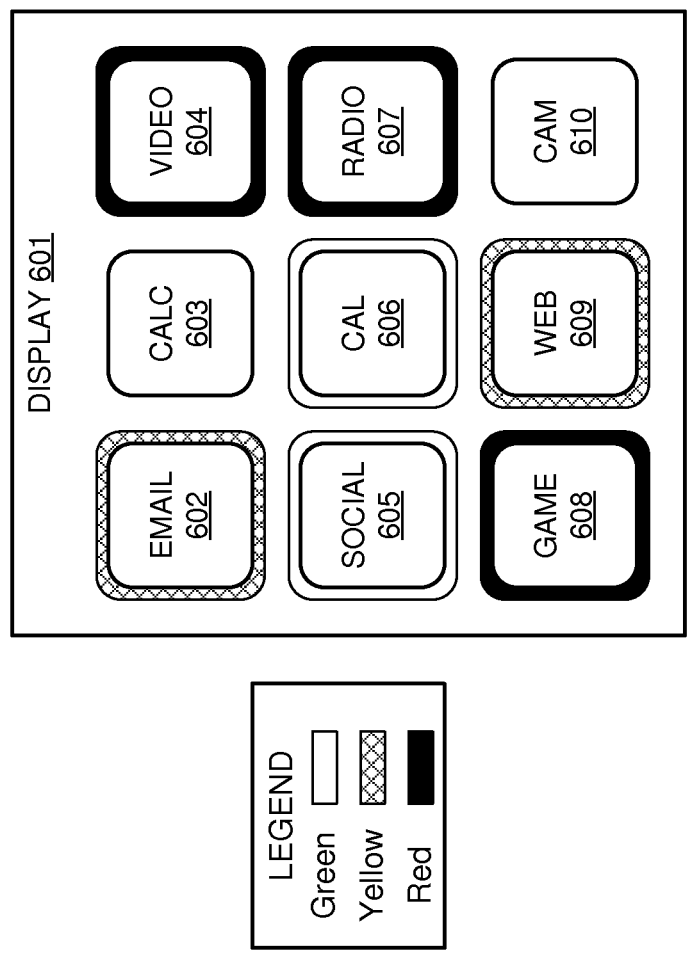
FIG. 6 illustrates a display for presenting conformity to restrictions on the use of a wireless communication device.

FIG. 6 illustrates display 601 as an example of display 406 from FIG. 4 after receiving the instruction to display the measures of conformity for each application to the user. Display 601 shows applications 602-610 as a grid of icons. A user selects an icon for the application that the user wants to execute. To aid the user in deciding whether to use a particular application, each application that uses network resources is surrounded by a color indicating the measure of conformity for the application. The color green indicates that the application has a good measure of conformity. The color red indicates that the application has a poor measure of conformity. The color yellow indicates that the application is nearing a poor measure of conformity.

The icons for video application 604, radio application 607, and game application 608 are each surrounded by a red color. Thus, the applications have a poor measure of conformity. When executing, each of these applications use large amounts of data bandwidth on a wireless network. In this example, there is a restriction that limits data bandwidth, such as a high cost for bandwidth or high network congestion, that is not conformed to by video application 604, radio application 607, and game application 608.

Similarly, the icons for email application 602 and web browser 609 are surrounded by yellow. Thus, these applications are merely approaching non-conformity with the restrictions on the use of the wireless device. Continuing the data bandwidth restriction example from above, email application 602 and web browser 609 do not use as much data bandwidth when executing as those applications surrounded by red.

Likewise, the icons for social networking application 605 and calendar application 606 are surrounded by green. In this example, the green indicates that the data usage of these two applications conforms well to the data bandwidth restrictions on the use of the wireless device. Additionally, while not shown on display 601, calculator application 603 and camera application 610 may also be surrounded by green since the applications do not use network resources.

Based on the three colors surrounding the application icons shown on display 601 a user may make a more informed decision about whether to use a particular application. Consistent with display 601, the user may want to hold off using the applications surrounded by red and think more carefully before using the applications surrounded in yellow.

FIG. 7 is a further example of display 601. In this example, the user wants to run video application 604 but, as before, the icon for video application 604 is surrounded by red. The user then indicates that the user would like to view more specific measures of conformity for video application 604. The indication may be made by pressing a menu button on the wireless device, by pressing the icon of video application 604 for an extended amount of time, or any other way that a user of a wireless device may request the display of further information. Alternatively, the user may select video application 604 and the information may be displayed before the wireless device executes video application 604.

In response to the user request for the specific measures of conformity, display 601 shows that the data plan measure of conformity is red and the network congestion measure of conformity is yellow. This information is shown as a pop up notification on display 601 but may take other forms. The data plan measure of conformity may be red because the data service plan for the user provides that data service is very expensive at the present time. The network congestion measure of conformity is yellow because the wireless network is experiencing a higher level of congestion but not so high as to require a red measure of conformity.

The user can then use this information to make a more informed decision about whether the user would like to execute the application. For example, the user may decide that the user is willing to pay the extra data plan cost of using video application 604 at this time and is willing to deal with any possible problems regarding the operation of video application 604 due to the yellow rated network congestion.

FIG. 8 is another example of display 601. In this example, the wireless device currently executing radio application 607. The user may be using radio application 607 to listen to streaming audio while accomplishing other tasks. When the wireless device determines a level of conformity for radio application 607, the wireless device determines that radio application 607 does not conform to the restrictions on the wireless device. Therefore, the wireless device surrounds the icon for radio application 607 in red. Additionally, since radio application 607 is currently executing on the wireless device and using network resources, the wireless device creates a notification asking the user if the user would like to terminate the execution of radio application 607. While this notification is shown as a pop up on display 601 other ways of notifying the user may be used.

If the user selects "YES", then radio application 607 is terminated so that radio application 607 no longer uses network resources. If the user selects "NO", then radio application 607 will continue to run despite the restriction violation. If the user selects "INFO", then the user may be provided with specific measures of conformity for audio application 607 similar to that shown in FIG. 7 for video application 604. The user can then make a more informed decision about whether the user wants radio application 607 to terminate.

Figure 9:
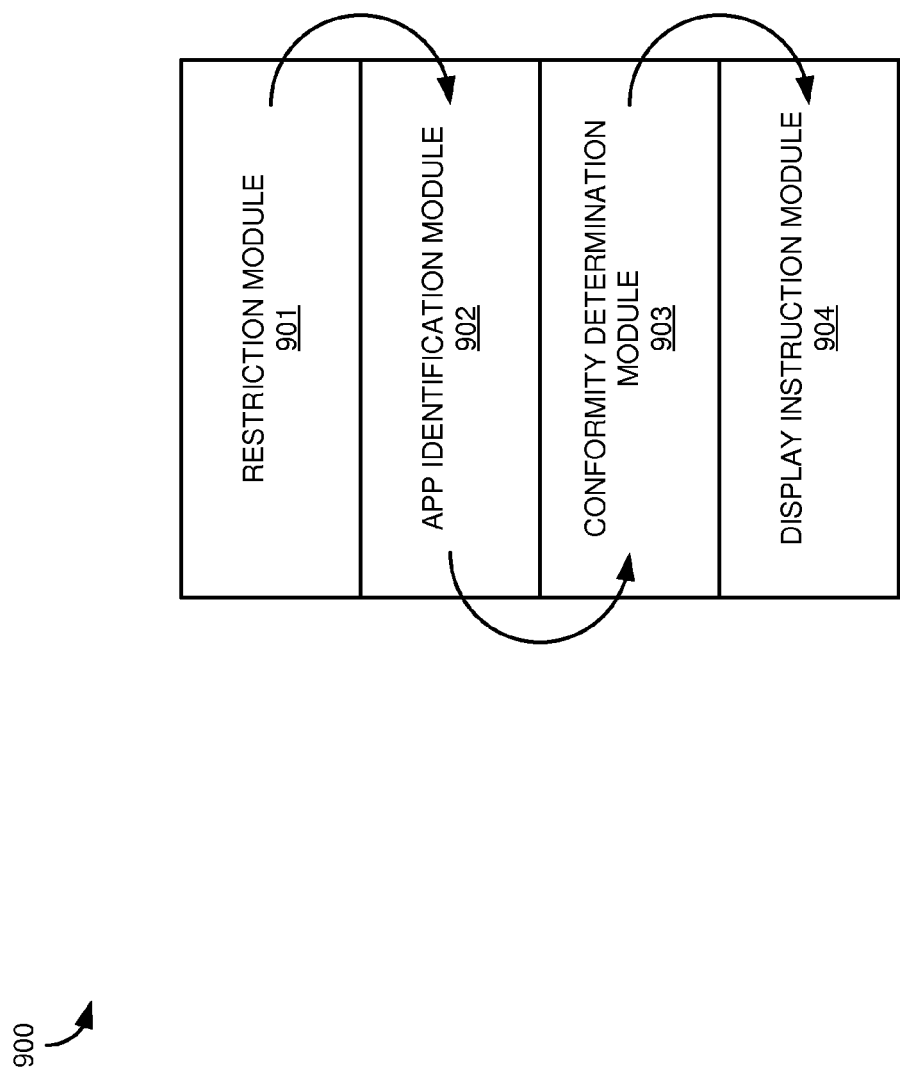
FIG. 9 illustrates a conformity analysis system for analyzing conformity to restrictions on the use of a wireless communication device.

FIG. 9 illustrates conformity analysis system 900. Conformity analysis system 900 includes restriction module 901, application identification module 902, conformity determination module 903, and display instruction module 904. The modules of conformity analysis system may be contained in a single computer system or spread across a combination of computer systems located in a communication network, such as a base station, mobile switching center, or a call processing system. Additionally, some or all of the modules may be located within a wireless communication device as hardware modules, software modules, or some combination thereof. Specifically, the example shown below for FIG. 10 presents modules 901-904 as part of the operating software for wireless device 1000.

In operation, restriction module 901 identifies restrictions on the use of a wireless communication device having applications available to the wireless communication device. Application identification module 902 identifies a first application of the applications available to the wireless communication device that uses resources of a wireless communication network. Conformity determination module 903 determines a first measure of conformity by the first application to the restrictions on the use of the wireless communication device. Display instruction module generates an instruction to display to a user an indication of the first measure of conformity by the first application to the restrictions on the use of the wireless communication device.

Figure 10:
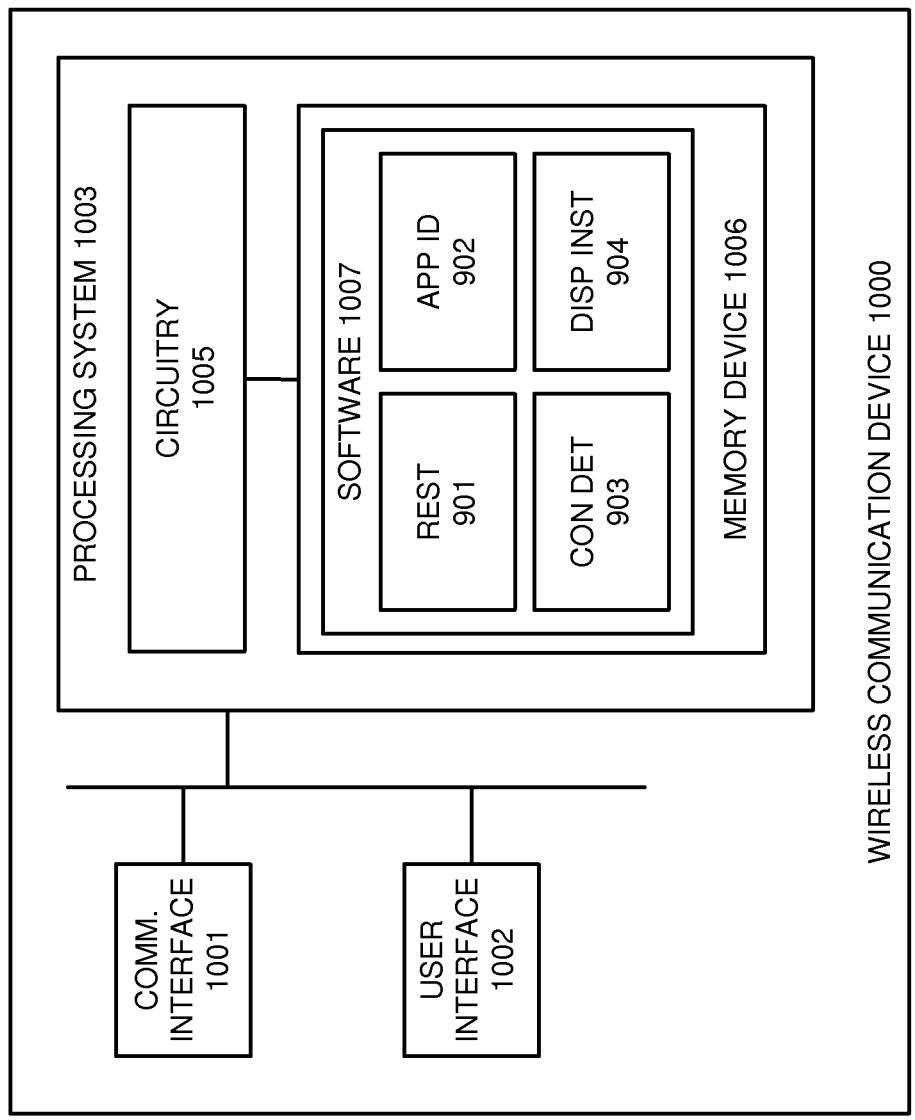
FIG. 10 illustrates a wireless communication system for analyzing conformity to restrictions on the use of the wireless communication device.

FIG. 10 illustrates wireless communication device 1000. Wireless communication device 1000 is an example of wireless communication devices 101 and 401, although devices 101 and 401 could use alternative configurations. Wireless communication device 1000 comprises wireless communication interface 1001, user interface 1002, and processing system 1003. Processing system 1003 is linked to wireless communication interface 1001 and user interface 1002. Processing system 1003 includes processing circuitry 1005 and memory device 1006 that stores operating software 1007. Wireless communication device 1001 may include other well-known components such as a battery and enclosure that are not shown for clarity. Wireless communication device 1001 may be a telephone, computer, e-book, mobile Internet appliance, media player, game console, wireless network interface card, or some other wireless communication apparatus—including combinations thereof.

Wireless communication interface 1001 comprises RF communication circuitry and an antenna. The RF communication circuitry typically includes an amplifier, filter, RF modulator, and signal processing circuitry. Wireless communication interface 1001 may also include a memory device, software, processing circuitry, or some other communication device. Wireless communication interface 1001 may use various protocols, such as CDMA, EVDO, WIMAX, GSM, LTE, WIFI, HSPA, or some other wireless communication format.

User interface 1002 comprises components that interact with a user to receive user inputs and to present media and/or information. User interface 1002 may include a speaker, microphone, buttons, lights, display screen, touch screen, touch pad, scroll wheel, communication port, or some other user input/output apparatus—including combinations thereof.

Processing circuitry 1005 comprises microprocessor and other circuitry that retrieves and executes operating software 1007 from memory device 1006. Memory device 1006 comprises a non-transitory storage medium, such as a disk drive, flash drive, data storage circuitry, or some other memory apparatus. Processing circuitry 1005 is typically mounted on a circuit board that may also hold memory device 1006 and portions of communication interface 1001 and user interface 1002. Operating software 1007 comprises computer programs, firmware, or some other form of machine-readable processing instructions. Operating software includes restriction software module 901, application identification software module 902, conformity determination software module 903, and display instruction software module 904. Operating software 1007 may also include an operating system, utilities, drivers, network interfaces, applications, or some other type of software. When executed by processing circuitry 1005, operating software 1007 directs processing system 1003 to operate wireless communication device 1000 as described herein.

In particular, restriction module 901 of operating software 1007 directs processing system 1003 to identify restrictions on the use of wireless communication device 1000 having applications available to wireless communication device 1000. Application identification module 902 directs processing system 1003 to identify a first application of the applications available to wireless communication device 1000 that uses resources of a wireless communication network. Conformity determination module 903 directs processing system 1003 to determine a first measure of conformity by the first application to the restrictions on the use of wireless communication device 1000. Display instruction module 904 directs processing system 1003 to generate an instruction to display to a user an indication of the first measure of conformity by the first application to the restrictions on the use of wireless communication device 1000.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication device having one or more applications, the method comprising:
   storing, by a processor having a memory, a data restriction for each one of the one or more applications;
   displaying, by a user interface icons corresponding to the one or more applications;
   receiving, by the user interface a user selection of the icon and receiving, by a communication interface, wireless data for the one or more applications;
   comparing, by the processor an amount of the received wireless data for the one or more applications to the data restriction for the one or more applications and determining a data conformity level for the one or more applications; and
   translating, by the processor the data conformity level for the application to a color and displaying, by the user interface the one or more icons for the one or more applications surrounded by a color to indicate the data conformity level of the application;
   wherein:
   when the amount of the received wireless data for the one or more applications exceeds the data restriction for the one or more applications then displaying the icon for the one or more applications surrounded by a first color, when the amount of the received wireless data for the one or more applications approaches the data restriction for the one or more applications then displaying the icon for the one or more applications surrounded by a second color that is different from the first color, and when the data restriction for the one or more applications exceeds the amount of the received wireless data for the one or more applications then displaying the icon for the one or more applications surrounded by a third color that is different from the first and the second color.

2. The method of claim 1 wherein the first color comprises red.

3. The method of claim 1 wherein the second color comprises yellow.

4. The method of claim 1 wherein the third color comprises green.

5. The method of claim 1 wherein one of the one or more applications comprises a web browser.

6. The method of claim 1 wherein one of the one or more applications comprises an email client.

7. The method of claim 1 wherein one of the one or more applications comprises a video application.

8. The method of claim 1 wherein one of the one or more applications comprises an audio application.

9. The method of claim 1 wherein the wireless data comprises Long Term Evolution (LTE) signals.

10. The method of claim 1 wherein the wireless data comprises WiFi signals.

11. A wireless communication device having one or more applications comprising:
    a processing system with a memory configured to store a data restriction for each of the one or more applications;
    a user interface configured to display one or more icons corresponding to the one or more applications and to receive a user selection of one of the one or more icons;
    a communication interface configured to receive wireless data for the one or more applications;
    the processing system configured to compare an amount of the received wireless data for the one or more applications to the data restriction for the one or more applications and determine a data conformity level for the one or more applications and translate the data conformity level for the one or more applications to a color; and
    wherein:
    when the amount of the received wireless data for the one or more applications exceeds the data restriction for the one or more applications then the user interface configured to display the one or more corresponding icons surrounded by a first color, when the amount of the received wireless data for the one or more applications approaches the data restriction for the one or more applications then the user interface configured to display the one or more corresponding icons surrounded by a second color that is different from the first color, and when the data restriction for the one or more applications exceeds the amount of the received wireless data for the one or more applications then the user interface configured to display the one or more corresponding icons surrounded by a third color that is different from the first and the second color.

12. The wireless communication device of claim 11 wherein the first color comprises red.

13. The wireless communication device of claim 11 wherein the second color comprises yellow.

14. The wireless communication device of claim 11 wherein the third color comprises green.

15. The wireless communication device of claim 11 wherein one of the one or more applications comprises a web browser.

16. The wireless communication device of claim 11 wherein one of the one or more applications comprises an email client.

17. The wireless communication device of claim 11 wherein one of the one or more applications comprises a video application.

18. The wireless communication device of claim 11 wherein one of the one or more applications comprises an audio application.

19. The wireless communication device of claim 11 wherein the wireless data comprises Long Term Evolution (LTE) signals.

20. The wireless communication device of claim 11 wherein the wireless data comprises WiFi signals.

* * * * *